June 11, 1963   R. K. REYNOLDS ET AL   3,092,919
VEHICULAR FRAMEWORK
Filed Jan. 3, 1961   5 Sheets-Sheet 2

INVENTORS
JAMES R. CLARKE AND
Ralph K. Reynolds
Paueo Pipes
Atty.

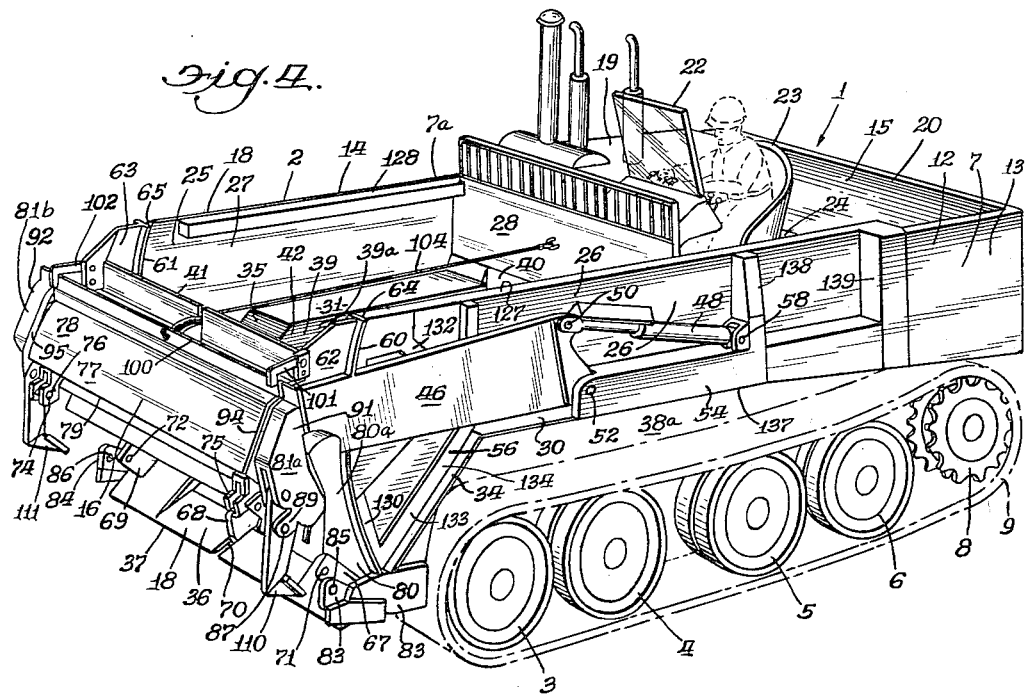
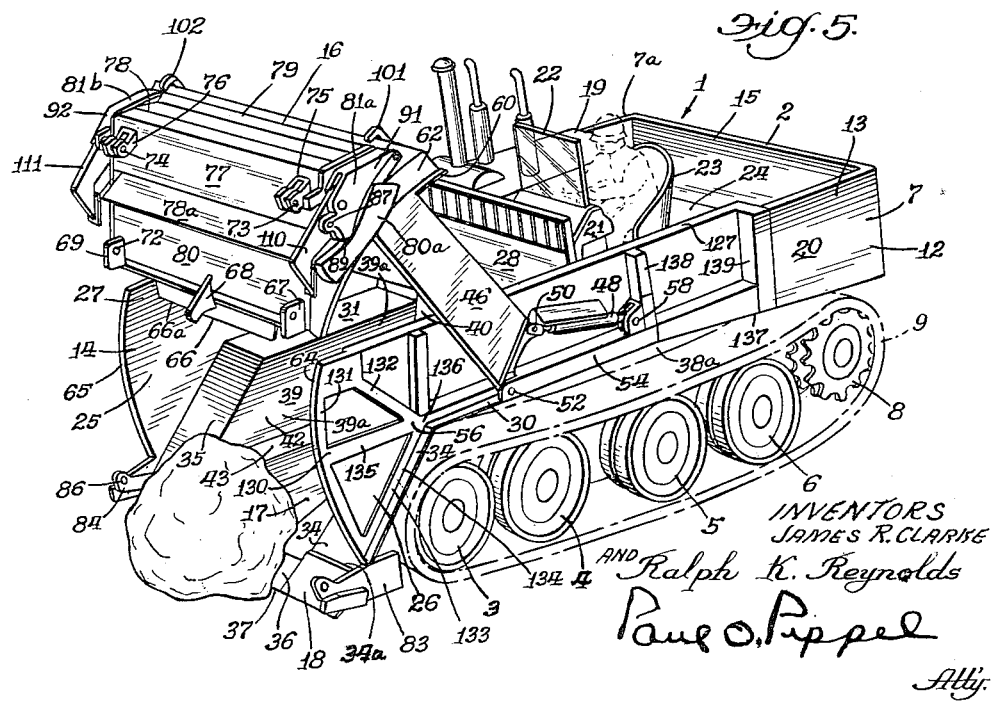

INVENTORS
JAMES R. CLARKE
AND Ralph K. Reynolds

Paul O. Pinned
Atty.

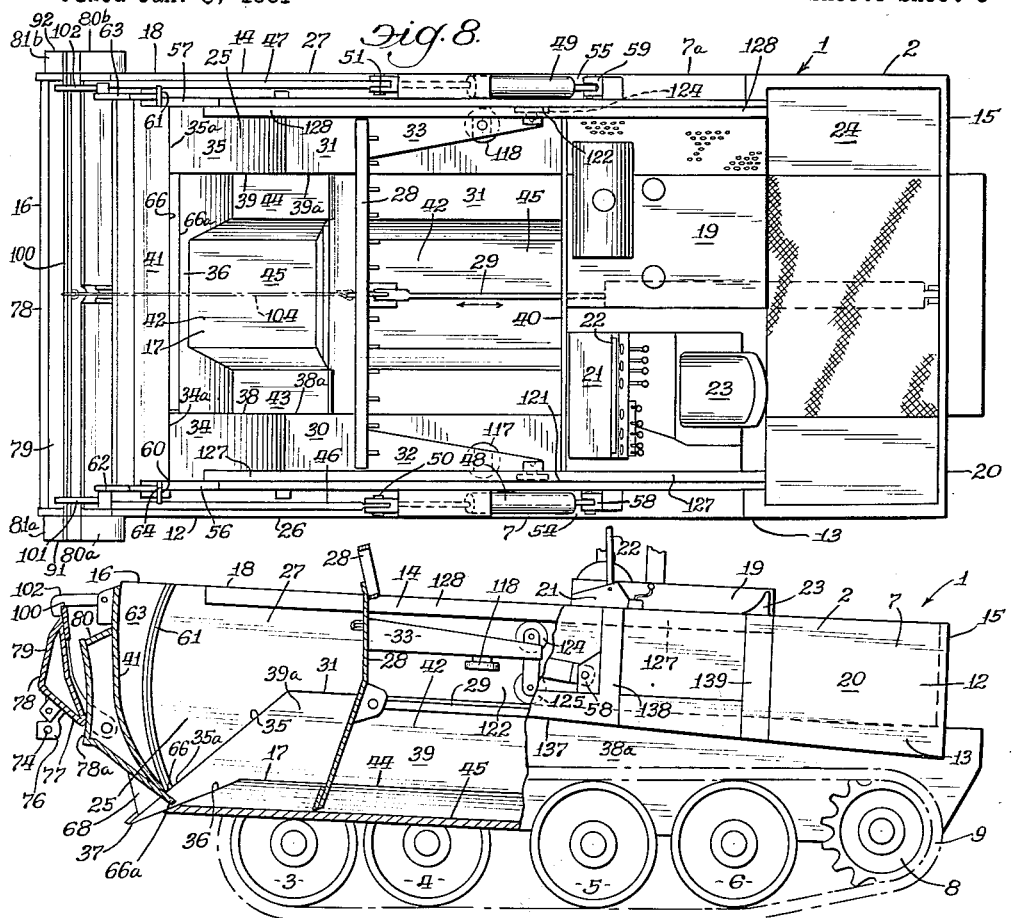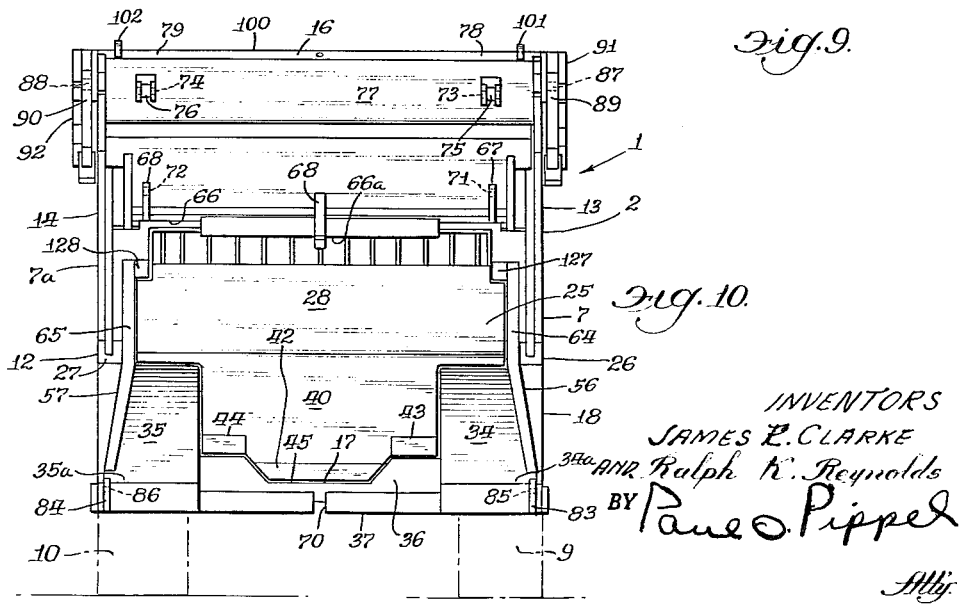

United States Patent Office 3,092,919
Patented June 11, 1963

3,092,919
VEHICULAR FRAMEWORK
Ralph K. Reynolds, Des Plaines, and James R. Clarke, Palatine, Ill., assignors to International Harvester Company, Chicago, Ill., a corporation of New Jersey
Filed Jan. 3, 1961, Ser. No. 80,413
13 Claims. (Cl. 37—4)

This invention relates to improvements in earthworking vehicles and more in particular relates to vehicles implemented for performing earth scraping, loading, and dozing operations.

It is therefore a general object of this invention to provide an improved implemented earthworking vehicle.

It is another object of this invention to provide a vehicle which may be loaded and unloaded in an easy manner and wherein the load may be transported at high speeds as well as at reduced speeds.

It is another general object of this invention to provide an earthworking vehicle constructed to perform dozing and earth scraping operations.

It is a further object of this invention to provide for a crawler tractor having a scraper bowl, a dozer element for performing dozing operations in conjunction with earth scraping operations.

It is a further object of this invention to provide an earthworking vehicle having a scraper bowl and the fore portion of which comprises a movable apron for opening the bowl to a load wherein said apron comprises a forward moldboard or dozer portion, a portion of which is swingable into a raised position for adding strength to the apron in a working position thereof.

A further object of this invention is to provide an earthworking vehicle having a frame work with a scraper bowl at its operating end including truss means for transferring load shocks imposed against said bowl.

A further object of this invention is to provide an earthworking vehicle carrying a strengthened dozer unit at the operational end of the vehicle for withstanding heavy external loads imposed upon the vehicle by way of the dozer unit.

It is a further object of this invention to provide an earthworking vehicle of the crawler tractor type having a scraper bowl at its forward end closable by a moving dozer element releasably lockable to said bowl wherein the bowl includes side members forming part of the vehicular frame, said side members having a plurality of beam structures for trussing the bowl against the heavy loads imposed upon the moldboard.

It is a further object of this invention to provide an earthworking vehicle which has means for varying its position relative to the ground in order to perform earthworking operations.

It is a further object of this invention to provide an earthworking vehicle that may have its attitude varied relative to the ground for varied operation of its associated earthworking implement.

These and other objects will become apparent from reference to the following drawings and description which portray an operable arrangement of our novel device without placing any limitation on the breadth or scope of the appended claims, wherein:

FIGURES 3 to 7 are perspective views looking down from various angles at the earthworking vehicle and showing the construction, arrangement, and functional operations of the various implements that are formed with and are part of the vehicle;

FIGURE 8 is a plan view of the novel implemented earthworking vehicle;

FIGURE 9 is a side elevational view of the vehicle with the front portion partly in section; and FIGURE 10 is a front elevational view of the vehicle with the dozer unit in a raised position.

Figure 1:
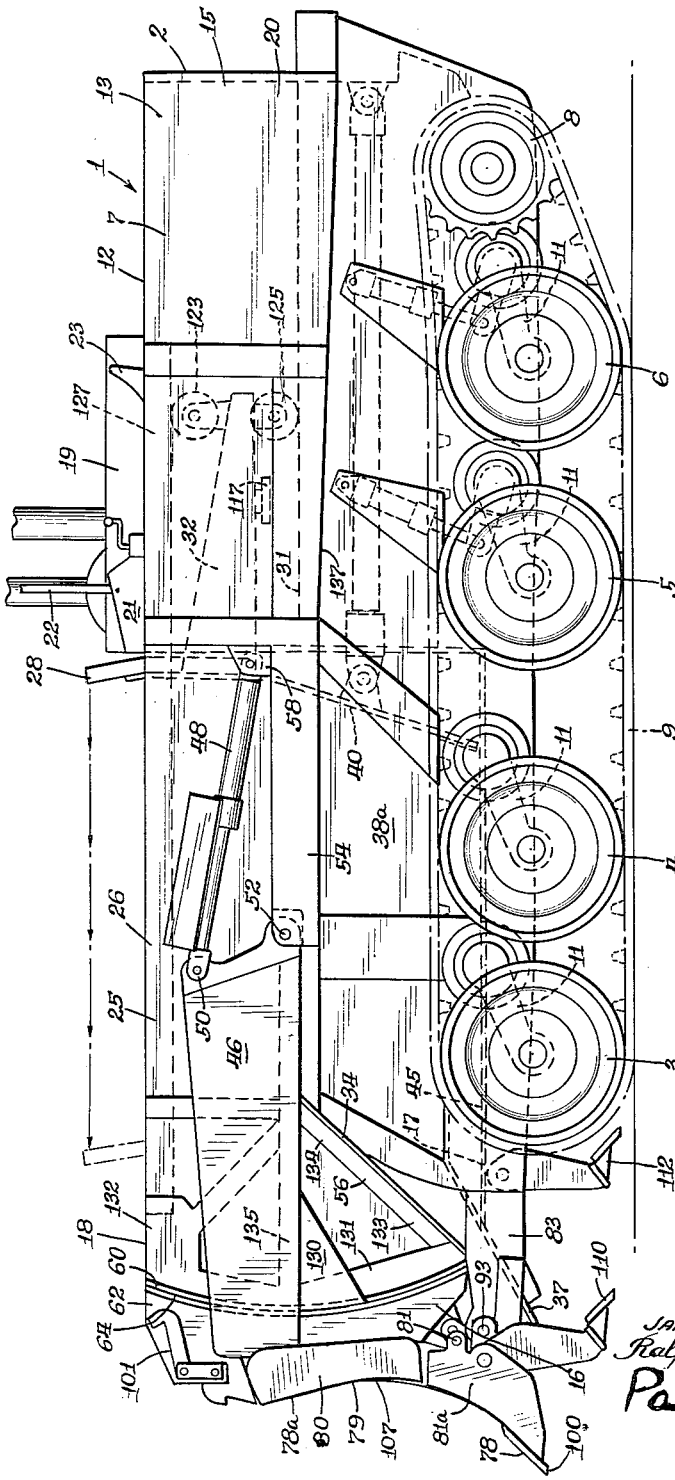
FIGURE 1 is a side elevational view of the novel implemented earthworking vehicle.

With reference to my three co-pending patent applications having U.S. Serial Nos. 80,449; 80,414; and 130,237; and filing dates of January 1, 1961, January 1, 1961, and August 7, 1961, respectively, and to the FIGURES 1 through 10 of the accompanying drawings, there is shown a vehicle 1 of the crawler tractor type having a body 2 and a plurality of ground traversing members or wheels 3, 4, 5 and 6 on either (left or right) side 7, 7a of the vehicle 1 driven by sprocket 8, the members on one side of the vehicle being encircled by track 9 and the members on the other side of the vehicle being encircled by the track 10 and interconnecting linkage 11 on the mechanism 1 between each of the members 3, 4, 5 and 6 and the body 2 of the vehicle 1 are so constructed as to allow relative movement between the body or frame 2 and between each wheel 3, 4, 5 and 6 such that the movement of each wheel 3, 4, 5 and 6 is independent or may be made independent of the movement of every other wheel 3, 4, 5 and 6 relative to the body 2. The body 2 consists of a rectangular frame work 12 having panel sides 13, 14, a rear side 15, and a forwardly disposed movable side 16 and a bottom or lower portion 17 at the front part 18 of the vehicle or tractor 2. The structural features of this framework will be discussed in greater detail hereafter.

It is to be noted that such expressions as front end or part or rear end or part is merely chosen to provide a geographic location and it will be understood that this expression is intended to merely locate the operating end of the vehicle 2 regardless of the direction in which the vehicle 2 is traveling.

The engine designated as 19 is located in the rearward portion 20 of the tractor 2 as are located all of the controls 21 for operating the vehicle 2. Alongside of the engine structure 19 located on platform 24 are the operator's seat 23 and windshield 22.

Forward of the platform 24 is the scraper bowl 25 formed by the forward ends 26, 27 of the side members 13, 14, the forward movable wall or apron 16, the floor 17 and the forward end of the platform 24. Reciprocal between the apron 16 and the platform 24 within the bowl 25 is the movable ejector gate 28 having an hydraulically operated ram unit 29 for ejecting loads from the bowl 25. Sponsons or ejector guide tracks 30, 31 flanked each inside and outside portion of the side walls 13, 14 over which ride inside bowl 25 extensions 32, 33 of the ejector 28 and have forwardly downwardly extending structures or ramps 34, 35 joining with the forward downward sloping end 36 of the bowl floor 17 to form a scaper bowl cutting edge 37. The inwardly facing vertical side surfaces 38, 39 of the lower side portions 38a, 39a of side walls 13, 14, the depending central portion 40 of the ejector gate 28, the floor 17, and inside concave surface 41 of the apron 16 form the lower or depressed bowl areaway 42 which at its forward end merges into the scraper cutting edge 37.

The scraper bowl 25 at the front end 18 of the tractor 1 is integral with the body framework or housing 12 so that when the body 2 is moved or tilted relative to the wheels 3, 4, 5 and 6 by the hydraulically operated linkage 11 between the wheels 3, 4, 5 and 6 and the body 2, the scraper edge 37 is also moved or tilted relative to the ground to cut the earth and fill the bowl 25 in accordance with the dictates of the operator. The bowl 25 is so constucted that the sponson-ramp structures 30–34, 31–35 act as fenders to protect the endless tracks 9, 10 from becoming damaged or having their movement interfered with by the earthen load spilling into the bowl 25 as the tractor 1 moves forward in its loading operation when the apron 16 is in the raised position as shown in FIGURES 5 and 10.

The interior of the bowl has a unique construction which takes its form from the sponson-ramp structures 30–34, 31–35 and the lower leveled flats 43, 44 of the floor and depressed horizontal surface 45 of the floor 17 running longitudinally of the tractor 1, the flats 43, 44 and depressed surface 45 at their forward ends merging to form the downward sloping bowl floor surface or end 36. The scraper edge surface 36 formed by the sponson-ramps 30–34, 31–35, the flats 43, 44 and the depressed surface 45 of the floor 17 all of which merge to form the cutting edge 37 presents a full width scraping edge 37 and the dirt or load entering the bowl 25 simultaneously rises up the slope end 36 of the bowl 25 and the ramps 34, 35, some of the dirt entering the bowl area 42 and the rest of the dirt going on the sponsons 30, 31 and falling off into the area 42 in a swirling action and the dirt or load is retained therein by lowering the apron 16 to the down position as shown in FIGURES 1 through 4 and 6 through 9.

Figure 2:
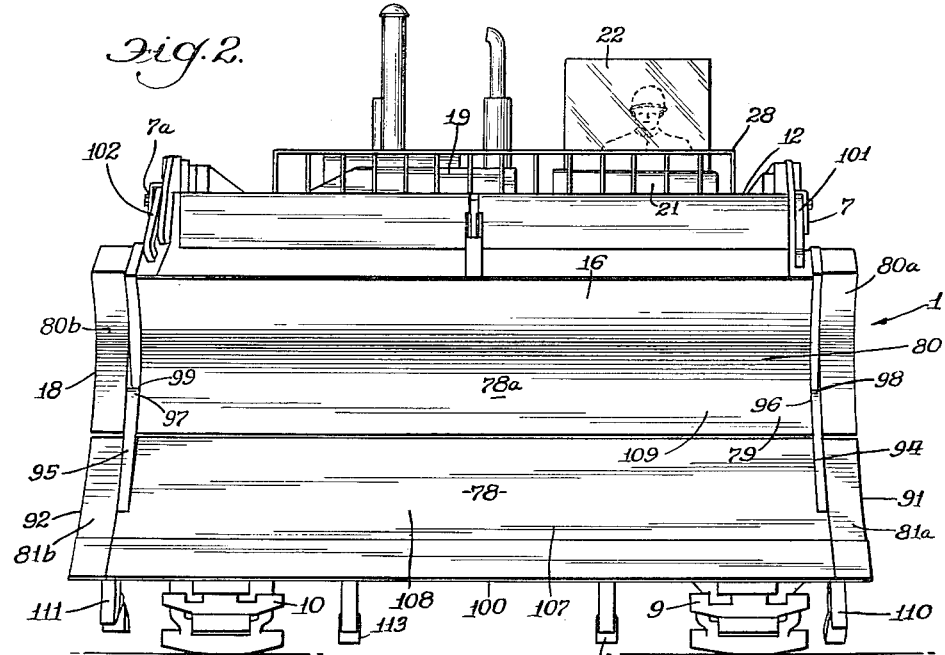
FIGURE 2 is a front elevational view of the earthworking vehicle with the dozer unit in a lowered position.
Figure 3:
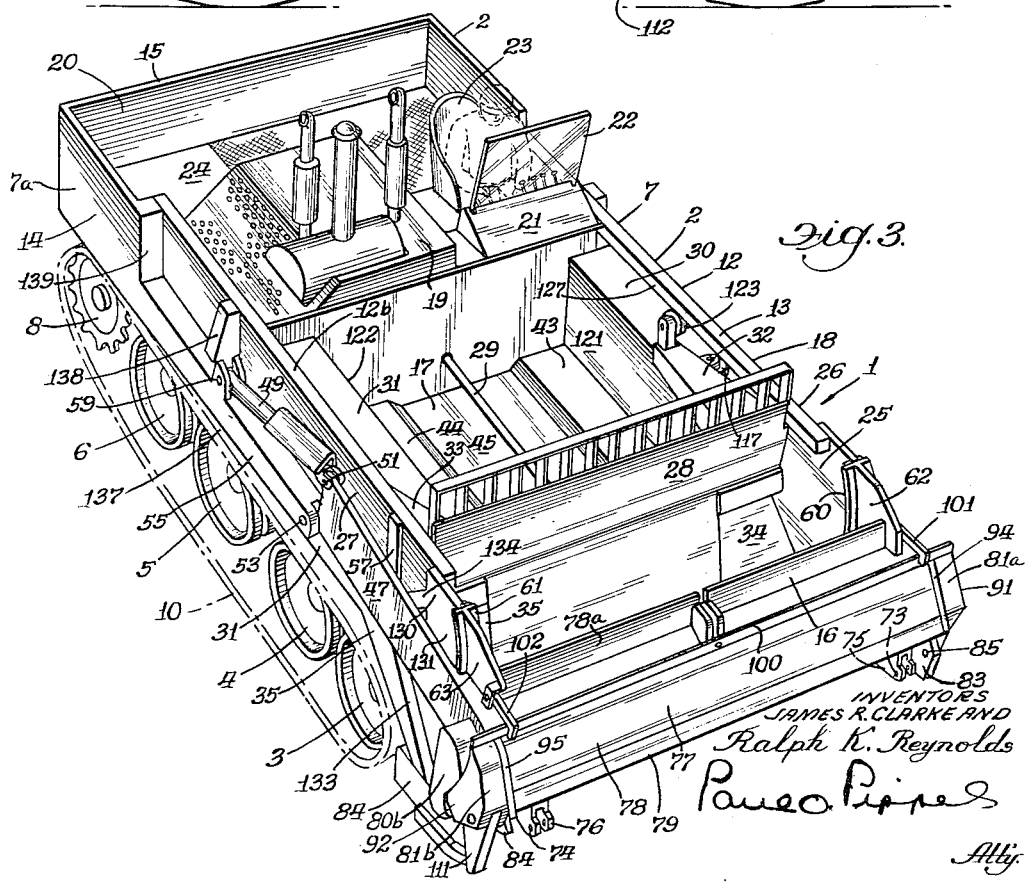

The apron unit 16 is attached to the front end 18 of the tractor 1 by the pair of extensions or arms 46, 47 on either side of the bowl 25 of the vehicle 1 which extensions 46, 47 at their rearward ends are pivotally connected to hydraulic ram units 48, 49 at pivot pins 50, 51 and to pivot pins 52, 53 on the horizontal ledges 54, 55 that are formed integral with the tractor side members 13, 14, the horizontal ledges 54, 55 extending towards the vertical or upright truss members 56, 57 also integral with the tractor side members 13, 14 and the ram units being attached by pivot pins 58, 59 on the horizontal ledges 54, 55. This type of pivotal connection through operation of the hydraulic ram units 48, 49 permits the scraper apron unit 16 to be swung vertically in an arcuate path around the forward end 18 of the side members 13, 14 about the pivots 52, 53 from a lower position as shown in FIGURES 1, 2, 3, 6, 7, 8 and 9 to a raised position as shown in FIGURES 5 and 10. In the lowered position the rearward or inwardly facing concave surface 41 of the apron unit 16 forms a frontal wall or bowl closure for the bowl 25 for holding a load therein and swinging of the apron 16 from the lowered position upwardly permits entrance of a load into the bowl 25 when the tractor 1 is performing scraping operations or the like up to a maximum raised position (see FIGURES 5 and 10) wherein the bowl 25 has its maximum opening. The inside concave faces 60, 61 of the side flanges 62, 63 and the apron 16 have a contour which conforms to and complements the contour of each of the outward facing convex surfaces 64, 65 of the truss elements 56, 57 of side members 13, 14 and the bottom or apron edge 66 of the frontal wall 16 lies adjacent or next to portions 34a, 35a of the ramps 34, 35 and has extension edge 66a adjacent the sloping portion 36 of the floor 17, the lugs 67, 68 and 69 on the underside or edge 66 of the apron 16 being adjacent the sloping portions 36 of the cutting edge area 37 which extends forwardly beyond the lower cutting edge 66 of the apron unit 16 outside of the bowl unit 25. The weight of the apron 16 actually rests against the downward sloping surfaces 36, 37 of the bowl 25 just rearward of the scraper edge 66 through the lugs or abutments 67, 68 and 69 integral with the lower portion of the apron 16, the central abutment 68 registerable in the slot 70 in the sloping portion 36 and the scraper edge 66a and each of the outer abutments 67, 69 having holes 71, 72 registerable with holes 73, 74 in ears or yoke extensions 75, 76 on the rearward side 77 (when in the dozing position, see FIGURES 1 and 2) of the lower or depending part 78 of the dozer portion 79 of the apron 16 for holding the depending part 78 fixed to the upper or apron part 80 of the dozer portion 79 of the apron 16 when pins 81 are inserted through the holes 71, 72, 73 and 74 for dozing operation (FIGURES 1 and 2). The dozer apron element 16 is similarly keyed to extensions 83, 84 on the portions 26, 27 of the side members 13, 14 of the frame 12, the extensions 83, 84 having holes 85, 86 registering with holes 87, 88 on extensions 89, 90 on the outward left and right sides 91, 92 of the depending dozer element 78 with pins 93 fixing the apron to the scraper bowl 25 and consequently when the tractor 1 is moving forward in the dozing position all loads are transmitted to the truss members 56, 57 of side portions 26, 27 of the bowl 25 via the dozer depending element 78 through the apron 16 such that the loads are transmitted to the heavy section of the depending part 78 to the side member portions 26, 27 without placing any load on the upper outward facing part 80 of the apron 16 and thus preventing the apron 16 from being pressed against the members 13, 14 avoiding damage to the apron such that the apron's flange surfaces 62, 63 could bind against the surfaces 60, 61 of the forward ends 26, 27 of the side members 13, 14 preventing relative vertical swinging movement between the apron 16 and the side members 13, 14. Also by so locking the dozer 79 to the truss members 56, 57 of side members 13, 14 a shock load can then be withstood.

The outward facing part 80 of the apron 16 of the scraper unit 25 forms the upper part 78a of the dozer unit 79 and is integral with the scraper apron 16. This upper dozer portion 78a carries the swingable member or lower dozer portion 78 which has arms 94, 95 integral therewith, the ends 96, 97 of the arms 94, 95 being pivotally attached to the outward facing forward section 78a of the apron 16 (i.e. the upper dozer part) intermediate its upper and lower ends thereof at pivots 98, 99 for vertically swingable movement from a lowered or dozing position wherein the dozer blade edge 100 is directed as shown in FIGURES 1 and 2 to a raised position as shown in FIGURES 3 through 5 and 7 through 10 wherein the outwardly extending dozer blade edge 100 may be locked against the outward facing upper portion 80 of the apron unit 16 by catches 101, 102 attached to the top side of the apron 16. The dozer blade portion 78 may be swung from its lowered position to its raised position by cable 104 attached to the middle portion of the dozer edge 100 and the central portion of the forward facing surface of the ejector gate 28, the cable 104 causing movement of the dozer blade portion 78 in accordance with the movement of the ejector gate 28. The dozer portion 78 in its lowered position may be locked as previously mentioned to the apron 16 and in the lowered position of the apron 16 to the side members 13, 14. It will be noticed that the depending portion or lower dozer part 78 of the apron 16 has an outwardly concave surface 107 which when placed in a lowered position forms one continuous concave surface 108 with the outer facing concave surface 109 of the outward upward portion 78a of the apron unit 16 thus forming a moldboard or dozing surface. The concave surface 108 of the dozer unit 79 it will be noted includes the extensions 80a, 80b of the upper dozer portion 78a and the extensions 81a, 81b of the lower dozer portion 78, said extensions 80a, 80b, 81a, 81b resulting in the concave dozer surface 108 to extend beyond the tractor width for greater dozing action on external loads.

Scarifying teeth 110, 111 are swingably depending from the backside of the lower dozer portion 78 and are positionable to cut or scarify the ground as the tractor 1 moves in a reversed position in a conventional manner and when the tractor 1 is going in a forward position with the apron 16 and the dozer portion 78 locked to the tractor side members 13, 14 in the lowered position, the dozer edge 100 can scrape the ground surface bringing the dirt up against the concave surface 108 of the dozer or moldboard unit 79 in conventional fashion. When the depending dozer portion 78 is raised so that its concave surface 107 lies up against the upper outside forwardly facing surface or upper dozer portion 109 of the apron unit 16 in its locked position, the apron 16 now being duly strengthened by the thickness of the dozer portion 78 and the thick portion 78a of the apron unit 16, is capable of knocking over objects such as trees and the like and the apron unit 16 may be vertically swingable in reciprocating hammer-like fashion attendant to knocking over such objects.

Another pair of scarifying teeth 112, 113 depend from the underside 114 of the tractor in such fashion that when the tractor 1 is going rearward the scarifying teeth 112, 113 are extended having their edges scarifying the ground in conjunction with the scarifying teeth 110, 111 on the depending dozer parts 78.

The ejector gate 28 has the pair of rearwardly extending elements 32, 33 carrying horizontal rollers 117, 118 at their rearward end for riding against the inward facing surfaces 121, 122 of the side members 13, 14 and a pair of vertically disposed rollers 123, 124 riding against the undersides of the inwardly projecting top ledges 127, 128 of the side members 13, 14 and a second pair of vertically disposed rollers 125 riding on sponsons 30, 31 the rollers 117, 118, 123, 124, 125 acting to guide and stabilize the movement of the ejector gate 28 when in motion.

In the scraper operation for tilting of the bowl 25 with a load, the depending part 78 of the dozer 79 is raised toward its locked upper position by the cable 104 (see FIGURE 6) to permit the lower dozer portion 78 with the dozer 79 to be clear of the path of the scraper edge 37 and bowl 25 by the retraction of the ejector gate 28 inwardly within the bowl 25 toward the rear of the tractor 1, final movement of the ejector 28 terminating when it is against the back of the bowl 25 and the depending part 78 of the dozer 79 is in the fully raised position with the dozer part 78 held against the front side 80 of the apron 16 at which time the hooks 101, 102 are then placed over the cutting edge 100 of the dozer depending part 78. Then the apron 16 is gradually opened and swung upward permitting the dirt cut by the scraper edge 37 to enter the bowl 25 and when sufficient load is placed within the bowl 25 the apron 16 may be lowered against the slope portions 34a, 35a such that the apron door 16 has its edge 37 flush against the sloping surface 34a, 35a.

Figure 6:
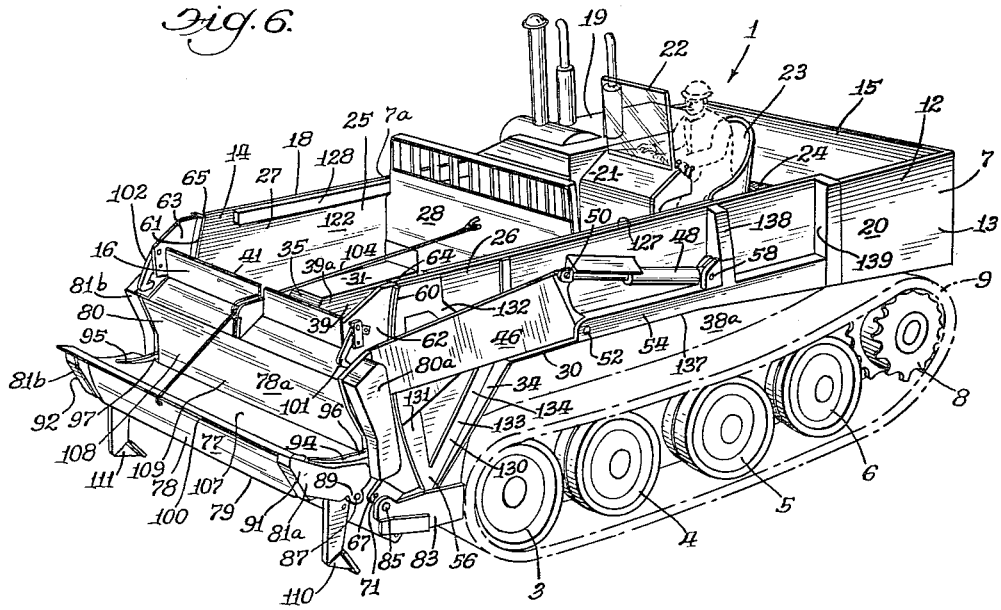
Figure 7:
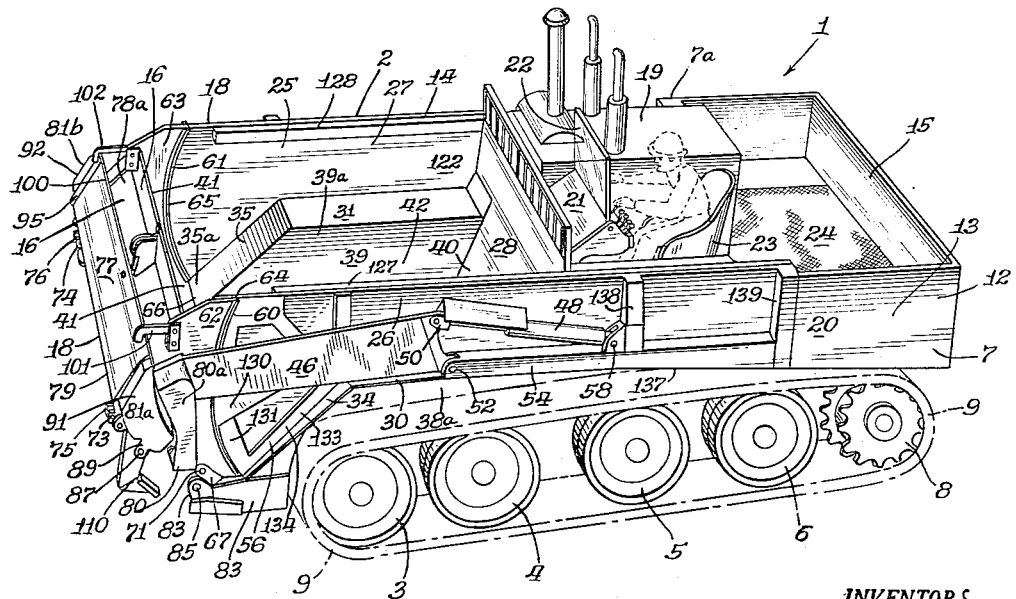

For dozing operations the apron 16 is placed in the downward or closed position as seen in FIGURES 1 and 2 with the bowl 25 filled with a load or empty. If the bowl 25 is filled with a load, the load acts as ballast and gives the tractor 1 a greater capacity for pushing or dozing objects or dirt in its path. If the bowl is empty and the depending part 78 of the dozer 79 is in the raised position the cable 104 may be connected to the dozer blade 100 and the ejector gate 28 as previously mentioned, and the ejector 28 moves from the rearward to the forward direction lowering the depending part 78 to the down position, as shown in FIGURES 1, 2 and 6 such that the dozer cutting edge 100 is in front of and below the scraper cutting edge 37 to perform moldboarding or dozing of the work in front of the tractor 1. If the scraper bowl 25 is filled with a load such that the ejector gate 28 cannot move forward the catches 101, 102 can be unlatched and the depending blade portion 78 of a dozer 79 may be allowed to fall in the dozing position so as to present in combination with the upper moldboard surface 80 a complete dozer blade and moldboard surface 108 exposed to the load in a manner as accomplished when lowered by the cable 104.

The design of this tractor not only permits its scraper element 25 to scrape the full width of the tractor but the sponson-ramp portions 30–34, 31–35 in combination with the bed 17 of the bowl 25 permit the entire forward portion 18 of the tractor 1 to act as a load storing bowl and yet to protect the endless tracks 9, 10 from being damaged by the load entering the bowl 25. Also when the bowl 25 is filled with material it increases the load working capacity of the tractor 1. Furthermore the forward wall or apron 16 of the tractor 1 serves to enclose the bowl 25 and aid the bowl 25 in being filled by gradual adjustment of the apron opening. The outward facing part 80 of the apron member 16 serves as a dozer blade 79 for pushing loads when the bowl 25 is closed, the dozer 79 being placed in the out-of-use position when the operator wishes to perform a scraping operation or unload the bowl 25 by ejecting the load with the ejector gate 28 which can raise and lower the dozer blade portion 78 into out-of-use positions. The dozer-apron structure 16 also may be used to strike at loads such as knocking over trees and the like.

Considering the strength characteristics of the framework of the tractor in greater detail it will be noted, as previously mentioned, that each side member 7, 7a comprises a substantially vertical panel 13 or 14 which at its forward end vertically broadens into the truss element 56 or 57 in the form of an enlarged track covering structure and which includes as a means of reinforcement a truss embossment 130 on its exterior side. The truss embossment 130 has a forwardly bowed compression member 131 which at its upper and lower ends merges into the upper and lower extremities of the forwardly diverging truss struts 132, 133 of the tension member 134 of the embossment 130, the rear or inner end of the truss struts 132, 133 merging into a substantially horizontal column member 135 intermediate its ends, the forward end of the column member 135 being integrated with the back edge of the compression member 131 at a point substantially medial thereof, the column member 135 extending rearwardly from the apex 136 of the truss embossment 130 over the sponson-ramp or fender structure 30–34 or 31–35 which projects laterally and outwardly of the side member 13 or 14. The rear end of the column 135 extends into the forward end of the fore and aft extending box section main beam or horizontal ledge 54 or 55 which forms an edge 137 of the side member 13 or 14, the beam 54 or 55 growing wider rearwardly and merging on its top side with the upright gusset column 138 and at its rear end with the upright gusset column 139. The beam 54 forward of the gusset 138 provides a pivotal connection by means of the pin 52 or 53 for the lower rear corner of the extension or boom 46 or 47 which is substantially quadriangularly shaped in side elevation and has a pivotal connection at its upper rear corner by the pin 50 or 51 to one end of the ram 48 or 49 extending diagonally downwardly and rearwardly and having a rear end as by the pin 58 or 59 to the ear structure 59a which is forward in a corner which develops between the main beam 54 or 55 and the gusset post 138. The side wall front end portion is also provided with a vertical stiffening rib 139a which extends from the apex 136 of the truss structure 56 or 57 to the upper edge 127 or 128 of the side 7 or 7a.

The forward end of the boom 46 or 47 merges with the guide and positioning plate or apron side flanges 62 or 63 forward on the adjacent lateral edge of the combination dozer apron unit 16, the rear edge of the plate 62 or 63 being provided with the wear rail or inside concave face 60 or 61 which could be subjected to sufficient deflection and may react against the forward edge or convex surface 64 or 65 of the compression member 131. However, any load against the outward side of the dozer apron unit 16 is transmitted to the locking extensions 67, 69 and 75, 76 of the upper part 80 of the apron 16 and the dozer depending portion 78, respectively to the extensions 89, 90 of the depending part 78 through to extensions 83, 84 integral with and depending from the truss embossment 130 which serves to take up the brunt of the load. Also external loads against the outward side of the apron 16 are transmitted through the boom 46 or 47 to the side 13 or 14 of the vehicle 1 before deflection of the wear rail 60 or 61 can normally occur.

Having described a novel earthworking vehicle having novel implement means to perform the operations discussed above, the appended claims follow, wherefore what is claimed is:

1. A vehicle containing a scraper bowl having a forward scraping edge and having a movable scraper apron wall rearward of the scraper edge operable in bowl closing relation therewith and vertically swingable about a transverse axis on the vehicle for accommodating the entrance of a load within the bowl and moldboard means carried by the apron wall vertically swingable relative to the wall about an axis transverse to the longitudinal axis of the tractor in an operative position and in an inoperative position of unobstructing relation with respect to the scraping edge, said bowl including side members having forward portions carrying truss means at the forward end thereof and being in contact with the apron wall and the moldboard means in the lowered operative position of the apron.

2. A vehicle containing a bucket like bowl having a forward scraping edge and having a movable scraper apron wall forward of the scraper edge operable in bowl closing relation therewith and vertically swingable about a transverse axis on the vehicle for accommodating the entrance of a load within the bowl and moldboard means carried by the apron wall vertically swingable relative to the wall about an axis transverse to the longitudinal axis of the tractor in an operative position and in an inoperative position of unobstructing relation with respect to the scraping edge, said bowl including side members carrying truss means at the forward end thereof and juxtaposed with the apron wall and the moldboard means in the operative position of the latter and locking means holding the apron wall and moldboard means immobilized against the truss means for transferring load shocks imposed on the moldboard to the truss means.

3. An earthworking vehicle carrying a load receptor having a pair of load sustaining side elements forming an entrance and a movable frontal member carried by the side elements and vertically swingable about an axis transverse thereto for opening and closing the entrance, and a moldboard carried by the frontal member and being rigidly immobilizingly juxtaposed with respect to the said elements in the operative position of the moldboard, and the side elements comprising truss beam means including anchorage connections for the frontal member and gussets forwardly disposed in load bearing association with the moldboard.

4. An earthworking vehicle carrying a load receptor having a pair of load sustaining side elements forming an entrance and a movable frontal member carried by the side elements and vertically swingable about an axis transverse thereto for opening and closing the entrance and a moldboard carried by the frontal member and being rigidly immobilizingly juxtaposed with respect to the said elements in the operative position of the moldboard, and said side elements comprising truss means being in contact with the frontal member in the lowered operative position of the frontal member.

5. An earthworking vehicle carrying a load receptor having a pair of load sustaining side elements forming an entrance and a movable frontal member carried by said side elements and vertically swingable about an axis transverse thereto for opening and closing the entrance and a moldboard carried by the frontal member and being rigidly immobilizingly juxtaposed with respect to the said elements in the operative position of the moldboard and side members comprising truss means including gussets forwardly disposed in load bearing association with the moldboard and locking means securing the frontal member and the moldboard to the gussets.

6. A tractive vehicle having a frame structure including a pair of laterally spaced side frames, each side frame including upright fore and aft elongated panelling, a lower beam member projecting outwardly from the panelling in a generally horizontal fore and aft direction, and a plurality of upright fore and aft spaced gusset structures integrated with said panel means and the beam member, and each side frame of the vehicle including a dependent forward end portion including truss structure comprising tension members diverging forwardly from the forward end of the lower beam member, compression member integral with the tension members and forming a forward edge portion of the framework, a scraper wall being pivotally connected to the bowl for vertical movement and being in contact with the forward end portions of the side frames when the scraper wall is in the lowered operative position.

7. A tractive vehicle having a frame structure including a pair of laterally spaced side frames, each side frame including upright fore and aft elongated panelling, a lower beam member projecting outwardly from the panelling in a generally horizontal fore and aft direction, and a plurality of upright fore and aft spaced gusset structures integrated with said panel means and the beam member, and each side frame of the vehicle including a dependent forward end portion including truss structure comprising tension members diverging forwardly from the forward end of the lower beam member, compression member integral with the tension members and forming a forward edge portion of the framework, and said lower beam member extending as a column from the areas of convergence of the tension members forwardly to the compression member intermediate ends thereon, a scraper wall being pivotally connected to the bowl for vertical movement and being in contact with the forward end portions of the side frames when the scraper wall is in the lowered operative position.

8. A tractive vehicle having a frame structure including a pair of laterally spaced side frames, each side frame including upright fore and aft elongated panelling, a lower beam member projecting outwardly from the panelling in a generally horizontal fore and aft direction, and a plurality of upright fore and aft spaced gusset structures integrated with said panel means and the beam member, and each side frame of the vehicle including a dependent forward end portion including truss structure comprising tension members diverging forwardly from the forward end of the lower beam member, compression member integral with the tension members and forming a forward edge portion of the framework, and said lower beam member extending as a column from the areas of convergence of the tension members forwardly to the compression member merging therewith in an area centrally thereon, a scraper wall being pivotally connected to the bowl for vertical movement and being in contact with the forward end portions of the side frames when the scraper wall is in the lowered operative position.

9. A tractive vehicle having a frame structure including a pair of laterally spaced side frames, each side frame including upright fore and aft elongated panelling, a lower beam member projecting outwardly from the panelling in a generally horizontal fore and aft direction, and a plurality of upright fore and aft spaced gusset structures integrated with said panel means and the beam member, and each side of the vehicle including a dependent forward end portion including truss structure comprising tension members having an area of convergence with one another and diverging forwardly from the forward end of the lower beam member, compression member integral with the tension members and forming a forward edge portion of the framework, and said lower beam member extending as a column from the area of convergence of the tension members forwardly to the compression member intermediate ends thereon, and a frontal member being connected to and forming a bowl closure with the forward end portions and comprising an apron movable in a vertical arcuate path transverse to the direction of movement of the vehicle, and a frontal edge integral with the forward ends of compression and tension members and being bowed forwardly and in juxtaposition with the arcuate path of travel of said apron.

10. A tractive vehicle having a frame structure including a pair of laterally spaced side frames, each side frame including upright fore and aft elongated panelling, a beam member projecting outwardly from the panelling in a generally horizontal fore and aft direction, and a plurality of upright fore and aft spaced gusset structures integrated with said panel means and the beam member, and each side frame of the vehicle including a dependent forward end portion including truss structure comprising tension members diverging forwardly from the forward end of the beam member, compression member integral with the tension members and forming a forward edge portion of the framework, an apron being in contact and forming a bowl closure with the forward end portions of the side frames when the apron is in the lowered operative position, and a pair of arms connected to the apron and each arm extending to a respective beam member and pivoted thereto in areas rearwardly of the truss structure.

11. A tractive vehicle having a frame structure including a pair of laterally spaced side frames, each side frame including upright fore and aft elongated panelling, a lower beam member projecting outwardly from the panelling in a generally horizontal fore and aft direction, and a plurality of upright fore and aft spaced gusset structures integrated with said panel means and the beam member, and each side of the vehicle including a dependent forward end portion including truss structure comprising tension members diverging forwardly from the forward end of the lower beam member, compression member integral with the tension members and forming a forward edge portion of the framework, an apron forming a bowl closure with the forward end portion, and arm connections to the apron and extending to the respective lower beam members and pivoted thereto in areas rearwardly of the truss structure, said apron having an outwardly loading facing moldboard surface, and interlocking means securing the apron in a bowl closed position and transmitting load shocks imposed on said surface to said truss structure.

12. A tractive vehicle having a framework including a scraper bowl integral at the forward end thereof, the framework having a pair of truss assemblies forming the sides of the bowl, each of the assemblies including embossed structure comprising panel means having in relief a horizontal beam member extending fore and aft of the tractor and a plurality of upright support units integral therewith, and a load absorbing gusset structure integral with each panel means and forming the forward ends of the bowl sides and comprising a horizontal compression beam flanked by a pair of diverging tension beams, the beams being integral with the horizontal beam member at their ends and forming an arcuate surface at their forward ends, and a scraper wall pivotally attached to the sides for vertical movement in an arcuate path in juxtaposition to the surfaces of the beams and being in contact with the forward ends of the sides when the scraper wall is in the lowered operative position.

13. A tractive vehicle having a framework including a scraper bowl integral at the forward end thereof, the framework having a pair of reinforcing assemblies forming the sides of the bowl, each of the asemblies including embossed structure comprising panel means having in relief a horizontal beam member extending fore and aft of the tractor and a plurality of upright support units integral therewith, and a load absorbing truss structure integral with each panel means and forming the forward ends of the bowl sides and comprising a horizontal compression beam flanked by a pair of diverging tension beams, the beams being integral with the horizontal beam member at their rearward ends and and arcuate member joining with the beams at their forward ends, and an apron wall forming the frontal section of the bowl and pivotally attached to the sides of the bowl for vertical movement in an arcuate path in juxtaposition to the arcuate member, the apron wall being lockable to said sides in the load thrust receiving position of the bowl and having an outwardly faced moldboard surface for dozing operation.

References Cited in the file of this patent

UNITED STATES PATENTS

| | | |
|---|---|---|
| 1,183,850 | Bright | May 23, 1916 |
| 1,594,609 | Frease | Aug. 3, 1926 |
| 2,163,979 | Judson | June 27, 1939 |
| 2,280,696 | French | Apr. 21, 1942 |
| 2,312,390 | Cordes | Mar. 2, 1943 |
| 2,483,269 | Fender | Sept. 27, 1949 |
| 2,841,894 | Valois | July 8, 1958 |

FOREIGN PATENTS

| | | |
|---|---|---|
| 1,037,094 | France | Sept. 14, 1953 |